Sept. 2, 1941.  J. H. STARR  2,254,399
CONCENTRATION TESTING APPARATUS AND METHOD
Filed Jan. 26, 1940
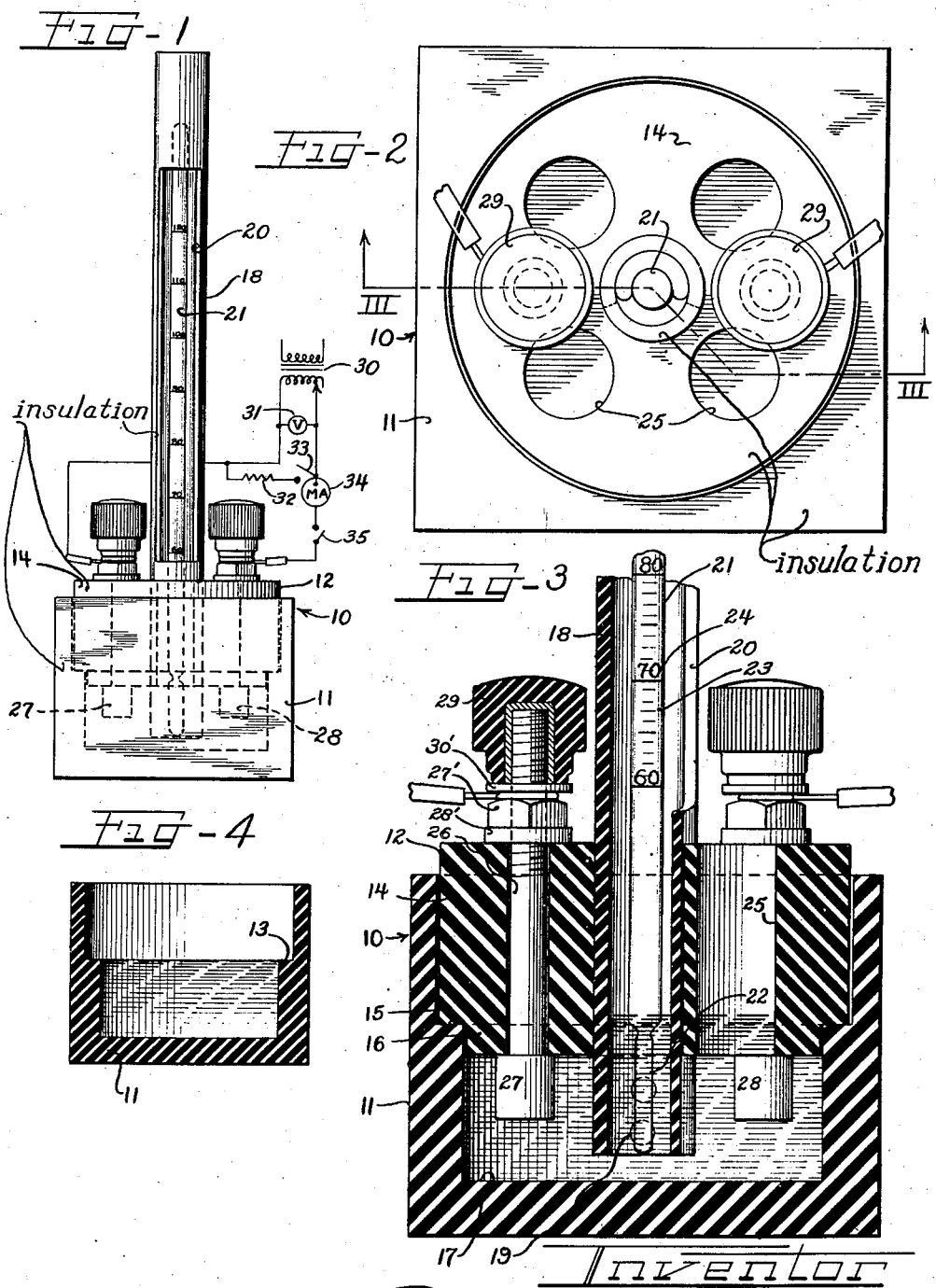
Inventor
James Hammond Starr Patented Sept. 2, 1941

2,254,399

UNITED STATES PATENT OFFICE 2,254,399

CONCENTRATION TESTING APPARATUS AND METHOD

James Hammond Starr, La Grange, Ill., assignor to Dearborn Chemical Co., Chicago, Ill., a corporation of Illinois Application January 26, 1940, Serial No. 315,682

18 Claims. (Cl. 175—183)

The present invention relates to a novel method and apparatus for measuring the conductivity of various media, but finds particular use in measuring fluids, usually liquids to determine the concentration of impurities or other substances therein.

For example, the invention may be utilized to determine the amount of salt content in water, the amount of foreign matter and the like in boiler water, condensed steam, etc.

Conductivity testing devices in general include some means for subjecting the medium to be tested to the measured flow of current between a pair of electrodes. In some cases these electrodes form a part of a cell or cartridge which may be immersed bodily in the medium, while in other cases a portion or sample of the medium is placed in a separate container having electrodes arranged therein. The present invention is primarily concerned with arrangements of the latter type, and contemplates as a primary object the provision of an improved cell for such purpose, which is so arranged as to materially facilitate the carrying out of the testing operations with a minimum of inconvenience and greater sustained accuracy than is now possible in the commonly known types of cells or cartridges.

A further object is to provide an improved testing cell that is so arranged that the conductivity measurement will always be made on a predetermined volumetric quantity of predetermined relative dimensions of the fluid being tested, thus eliminating to a large extent the possibilities of error.

A further object is to provide an improved testing cell embodying novel temperature responsive means for indicating the temperature of the liquid in the cell.

A further object is to provide a cell of the type described having electrodes which may be inspected, cleaned, or replaced with minimum inconvenience, thus assuring that the accuracy of the cell is maintained even though the surfaces of the electrodes may be attacked chemically or electrolytically, or may be subject to the deposit of film which would, if permitted to remain, alter the apparent conductivity of the sample in normal operation.

Another object of the invention is to provide a cell of the herein described type having removable electrodes which are so arranged as to prevent their being simultaneously engageable against a flat metallic surface and thus cause a short circuit to the testing apparatus.

Still another object is to provide in a cell of the herein described type improved overflow means for receiving surplus liquid placed in the cell over and above a predetermined volumetric amount, thus assuring that the test will always be performed on a predetermined unit amount of the liquid.

Other objects and features of the invention will more fully appear from the following detailed description taken in connection with the accompanying drawing which illustrates a single embodiment thereof, and in which:

Figure 1 is a view in elevation of a testing cell embodying the features of the present invention, this view additionally schematically showing one form of electrical system with which the cell may be utilized;

Figure 2 is an enlarged plan view of the cell;

Figure 3 is an enlarged sectional view through the cell showing its constructional details taken substantially on line III—III of Figure 2; and Figure 4 is a detailed view in section of the cup portion of the cell showing its construction.

As shown on the drawing:

For purposes of illustration and without limiting myself thereto, there is specifically illustrated a form of the invention particularly applicable to the testing of conductivity of liquids and which includes a testing cell generally indicated by the numeral 10.

As will be clearly evident from the drawing, the testing cell comprises two major parts, namely, a cup-shaped container 11 and a closure for the container as indicated at 12.

As more specifically shown in Figures 3 and 4, the cup-shaped container may be of any desirable outside shape, but is preferably provided with a circular interior open at its top. The container is preferably made from suitable insulating material such as "Bakelite." The inside of the container is constructed intermediate its top and bottom with an outwardly offset shoulder 13 which forms the junction between the lower portion of the container of smaller diameter and the upper portion of the container of larger diameter.

The closure for the container is likewise preferably constructed of an insulating material such as "Bakelite." The closure comprises a circular plug portion 14 which is rabbeted at its lowermost edge to form a seating shoulder 15 adapted to seat on the shoulder 13 of the container when the plug is placed in the top of the container. It will be noted that this construction also results in the formation of a bottom portion 16 on the plug which projects into the lower portion of the container below the shoulder 13 thereof.

This projection of the plug in closing position as shown in Figure 3 causes the plug to cooperate with the container to define a testing compartment or chamber 17 in the container, this chamber having a predetermined volumetric content.

Centrally extending through the plug is a tube 18, which is preferably of insulating material, the lowermost end of this tube being arranged to project into the chamber 17 and being provided in its projecting portion with wall openings 19. Intermediate its ends, and exteriorly of the housing formed by the container 11 and the plug 12, the tube is provided with a longitudinally extending slot or window 20. The tube 18 forms a protective housing for a thermometer 21 which may be supported in any suitable manner within the tube with its bulb portion 22 within the projecting lowermost end of the tube and its scale portion 23 so disposed that temperature indicating indicia 24 on the scale may be viewed through the window 20 of the tube.

Surrounding the tube 18 and circumferentially spaced are a plurality of passageways 25 having their axes in parallel relation with the axis of the tube 18, these passageways communicating at their lowermost ends with the chamber 17 and at their uppermost ends with the exterior of the housing.

Diametrically disposed on opposite sides of the tube 18 are terminal studs 26 which extend through suitable passageways in the plug 14 and are provided at their lowermost ends with head portions which define electrodes 27 and 28 arranged to project into the chamber 17, these electrodes being disposed on opposite sides of the projecting lowermost end of the tube 18.

The uppermost end of each terminal stud is threaded and provided with a suitable securing nut 27', by means of which the terminal studs may be secured in the plug. It is preferable to provide a suitable washer 28' of insulating material between the nut 27' and the adjacent surface of the plug. Suitable insulated nuts 29 are provided for threading on to the extreme ends of the threaded portion of the studs, these nuts being arranged to bear against a suitable washer 30' for bearing against electrical connections which may be made to the terminals.

It will be noted that the lowermost end of the tube 18 projects below the lowermost ends of the electrodes 27 and 28, and since the tube 18 is larger than the electrodes, it is impossible when the closure 12 is removed from the said container to simultaneously contact the electrodes against a flat metallic surface and thus short the electrical circuit connected thereto.

The cell of the present invention may be utilized with electrical systems embodying various arrangements. One such arrangement with which the cell may be utilized is schematically disclosed in Figure 1. In this system, there is provided a suitable transformer 30 which may be connected on its primary side to a suitable source of electrical energy. This transformer preferably has an adjustable secondary to enable adjustment of the secondary voltage to be used in the testing operation. A suitable voltmeter 31 may be connected across the secondary winding of the transformer to indicate the secondary voltage supplied to the testing circuit.

It is the usual practice in this type of apparatus to first adjust the secondary voltage of the transformer to give a predetermined voltage, depending upon the temperature of the liquid to be tested. In adjusting the transformer for such voltage, a load impedance 32 is first connected across the transformer secondary by means of a switch 33. The testing circuit having thus been calibrated for the temperature of the liquid being tested, the switch 33 is opened and a milliammeter 34 connected in series with the electrodes 27 and 28 by closing a switch 35.

The milliammeter then indicates on a suitable scale the amount of current flowing through the liquid between the electrodes 27 and 28. The scale of the milliammeter may indicate directly in amperes and be compared with a standard scale giving milliamperes in terms of concentration at various temperatures of the liquid. Moreover, if desired, the scale of the milliammeter may be calibrated to read directly in terms of concentration in the liquid being tested.

In placing the liquid in the container 11, enough liquid is placed in the container to bring its level just to the shoulder 13. It will be noted that when the plug 14 is placed in position in the top end of the container, the bottom projecting portion 16 extends into the liquid and acts as a plunger to force any surplus liquid within the chamber 17 up into the passageways 25 and the interior of the tube 18. Due to this action, the electrodes during each test operate on a unit volumetric quantity of the liquid being tested. It will be noted that the liquid forced into the passageways 25 is separated between the passageways by insulating material so that a current flow path is not established in the portions of the liquid lying within the passageways 25 or the tube 18 above the bottom of the plug 14.

Temperature readings for use in calibrating the electrical system and adjusting the secondary voltage of the transformer 30 are readily obtainable from the thermometer 21 readings.

In the event that liquid should be forced out of the uppermost ends of the passageways 25, this liquid will run off and the insulating washers 28 on the terminal studs will prevent the establishing of a leakage circuit between the terminal studs connected to the electrodes.

During the testing of fluids it is extremely important in order to obtain accurate readings that the electrodes shall be kept clean and free from film deposits. In the cell structure of the present invention the electrodes are disposed so that they may readily be inspected, and should a film be deposited, this film may be easily removed without having to remove the electrodes.

Moreover, if the electrode surfaces should be attacked chemically or electrically, which would alter the test readings, the cell construction is such as to enable the electrodes to be easily replaced with a minimum of inconvenience.

In order to remove an electrode, it is only necessary to unscrew the nuts 27' and 29 from its threaded end, whereupon the electrode may be longitudinally withdrawn from the associated plug and a replacement electrode inserted and secured in its place.

Thus the accuracy of the cell may be maintained and dependable readings assured when my improved cell is utilized.

From the foregoing description, it will be apparent that the present invention provides an improved cell for use in the testing of the electrical conductivity of fluids, particularly liquids, which is so arranged as to materially facilitate the carrying out of the testing operations with a minimum of inconvenience and with greater sustained accuracy than is now possible in the commonly known cell arrangements; which measures the conductivity on a predetermined volumetric quantity of the fluid, this eliminating to a large extent the possibilities of error; which includes novel temperature responsive means for indicating the temperature of the liquid in the cell; which is so arranged as to prevent inadvertently short circuiting the electrodes by simultaneously contacting them with a flat metallic surface; which embodies improved overflow means for receiving surplus liquid placed in the cell, when the amount of liquid placed therein exceeds a predetermined volumetric amount; and which permits the electrodes to be inspected, cleaned, or replaced with a minimum of inconvenience.

Now it is, of course, to be understood that although I have described in detail the preferred embodiment of my invention, the invention is not to be thus limited but only in so far as defined by the scope and spirit of the appended claims.

I claim as my invention:

1. A fluid conductivity testing device comprising a housing defining an open receptacle for receiving an isolated sample of a fluid to be tested, a removable closure for the receptacle, said receptacle and closure defining a testing compartment lined with insulating material, and a pair of electrodes of like material carried by the closure arranged to contact the fluid in the testing compartment, when the closure is in receptacle closing position.

2. A conductivity testing device comprising an open container for material to be tested, a closure for the container arranged to extend into the container and form a closed compartment of predetermined size, means for receiving any surplus material over that required to completely fill the compartment, and spaced electrodes of like material in said compartment for contacting said material therein.

3. A fluid conductivity testing cell comprising a container defining a compartment of predetermined size for receiving fluid to be tested, and a pair of spaced testing electrodes of like material in said compartment for contacting the fluid therein and adapted to have a potential applied thereto, said container having a passageway out of the direct path between said electrodes for receiving any surplus fluid over that required to completely fill said compartment.

4. A fluid conductivity testing cell comprising a container defining a fluid receiving compartment of predetermined size, a pair of spaced testing electrodes in said compartment for contacting the fluid therein and adapted to have a potential applied thereto, said container having a plurality of passageways for receiving surplus fluid over that required to completely fill said compartment, and baffles of insulating material separating the fluid in said passageways.

5. A fluid conductivity testing device comprising a housing defining a compartment walled with insulating material for receiving a predetermined amount of the fluid to be tested, spaced electrodes of like material contactable by the fluid, and temperature responsive means for indicating externally of said housing the temperature of the fluid within said compartment.

6. A fluid conductivity testing device comprising a housing defining a compartment for receiving a predetermined amount of the fluid to be tested, spaced electrodes of like material engageable by the fluid, and a thermometer having a bulb portion arranged to contact the fluid within the compartment between the electrodes, said thermometer including means for indicating exteriorly of the housing the temperature of the fluid within the compartment.

7. A fluid conductivity testing device comprising a housing defining a compartment for receiving a predetermined amount of the fluid to be tested, spaced electrodes engageable by the fluid, a thermometer having a bulb portion arranged to contact the fluid within the compartment between the electrodes, said thermometer having a temperature indicating scale disposed exteriorly of the housing, and a shield between said bulb and the electrodes.

8. As an article of manufacture, a fluid conductivity testing device comprising a housing defining a compartment for receiving a sample of the fluid to be tested, spaced electrodes engageable by the fluid, a tubular member extending into the compartment between the electrodes and having an opening in its wall disposed exteriorly of the housing, and a thermometer housed within the member for indicating the temperature of the fluid placed in the compartment, said thermometer having a temperature scale viewable through the opening in said member.

9. As an article of manufacture, a fluid conductivity testing device comprising a cup-shaped member for receiving a quantity of the fluid to be tested, a plug removably disposable in the open end of the member and cooperating therewith to define a compartment of predetermined size, a plurality of spaced electrodes carried by the plug engageable by the fluid in said compartment, and a projection on the plug between the electrodes extending past the outermost end portions of the electrodes for preventing inadvertently connecting the electrodes by engaging their outermost ends against a flat metallic surface.

10. As an article of manufacture, a fluid conductivity testing device comprising a cup-shaped member for receiving a quantity of the fluid to be tested, a plug removably disposable in the open end of the member and cooperating therewith to define a testing chamber, and a plurality of electrodes extending into said chamber, said plug having a plurality of passageways for receiving overflow from the chamber of fluid in excess of that required to fill the chamber.

11. As an article of manufacture, a fluid conductivity testing device comprising a cup-shaped member for receiving a quantity of the fluid to be tested, a plug removably disposable in the open end of the member and cooperating therewith to define a testing chamber, said plug having a passageway communicating with the chamber for receiving overflow therefrom of fluid in excess of that required to completely fill the chamber, electrodes in the plug on opposite sides of said passageway, the fluid in the chamber engaging the electrodes, and means isolating the portion of the fluid in said passageway relative to the flow of current between the electrodes.

12. A fluid conductivity testing cell comprising a container disposed to receive a sample of the fluid to be tested, means for isolating and determining a portion of said samples of predetermined dimensions, a plurality of electrodes of like material immersible in the isolated portion of the said sample and in predetermined dimensional relation to the boundaries thereof, temperature indicating means immersible in the isolated portion of said sample and in predetermined dimensional relation to the boundaries thereof, and protective means to minimize the probability of inadvertent breakage of said temperature indicating means.

13. A fluid conductivity testing cell comprising a container disposed to receive a sample of the fluid to be tested, means for isolating and determining a portion of said sample of predetermined dimensions, a plurality of electrodes immersible in the isolated portion of the said sample and in predetermined dimensional relation to the boundaries thereof, temperature indicating means immersible in the isolated portion of said sample and in predetermined dimensional relation to the boundaries thereof, and means for protecting the temperature means and minimizing the possibility of inadvertent short circuiting of said electrodes when removed from said cell.

14. A fluid conductivity testing cell comprising a container disposed to receive a sample of the fluid to be tested, means for isolating and determining a portion of said sample of predetermined dimensions, a plurality of electrodes immersible in the isolated portion of the said sample and in predetermined dimensional relation to the boundaries thereof, temperature indicating means immersible in the isolated portion of said sample and in predetermined dimensional relation to the boundaries thereof, protective means to minimize the probability of inadvertent breakage of said temperature indicating means, and protective means to minimize inadvertent short circuiting of said electrodes when removed from said cell.

15. A fluid conductivity testing cell comprising a container disposed to receive a sample of the fluid to be tested, means for isolating and determining a portion of said sample of predetermined dimensions, a plurality of replaceable electrodes immersible in the isolated portion of the said sample and in predetermined dimensional relation to the boundaries thereof, temperature indicating means immersible in the isolated portion of said sample and in predetermined dimensional relation to the boundaries thereof, and protective means extending exteriorly and interiorly of said container to minimize the probability of inadvertent breakage of said temperature indicating means.

16. A method of measuring the electrical conductivity of a fluid, which method includes the steps of: initially confining an amount of the fluid to be tested in a chamber, disposing a plurality of electrodes in the fluid, reducing the size of the chamber to obtain a predetermined volumetric quantity of the fluid, and then subjecting said predetermined quantity of fluid to a measured flow of current between said electrodes.

17. A fluid conductivity testing device comprising a cup-shaped member of insulating material for receiving an isolated quantity of a fluid to be tested, a plug of insulating material slidably insertable into the open end of the member, said plug having a plurality of spaced axially extending passageways therethrough, means limiting the extent of insertion of said plug into the member, said plug and member cooperating to define a compartment of predetermined size and certain of said passageways defining receivers for any surplus fluid over that required to completely fill said compartment, and electrodes contactable by the fluid in said compartment, said electrodes having connection portions extending through other of said passageways.

18. A method of measuring the electrical conductivity of a fluid, which method includes the steps of: isolating and confining a sample of the fluid to be tested in a chamber, reducing the size of the chamber with the fluid therein to a predetermined volumetric capacity to obtain a measured quantity of the fluid, and then subjecting said measured quantity of fluid to a measured flow of current between predetermined points therein.

JAMES HAMMOND STARR.